United States Patent
Hwu et al.

(10) Patent No.: US 8,573,916 B2
(45) Date of Patent: Nov. 5, 2013

(54) TRAILER FOR HELICOPTER

(75) Inventors: Long-Cherng Hwu, Taichung (TW);
Hsu-Chih Cheng, Taichung County (TW); Yen-Tsung Tsai, Taichung (TW); Yang-Ming Chuang, Taichung (TW); Chin-Lung Hsieh, Taichung County (TW); Fu-Huang Chen, Taichung (TW); Pei-En Wu, Taichung (TW); Chuang-Lu Wang, Taichung (TW)

(73) Assignee: Aerospace Industrial Development Corporation, Taichung (TW)

( * ) Notice: Subject to any disclaimer, the term of this patent is extended or adjusted under 35 U.S.C. 154(b) by 646 days.

(21) Appl. No.: 12/730,384

(22) Filed: Mar. 24, 2010

(65) Prior Publication Data

US 2010/0254791 A1 Oct. 7, 2010

(30) Foreign Application Priority Data

Apr. 7, 2009 (TW) ................................ 98205547 U

(51) Int. Cl.
*B60P 3/11* (2006.01)
*B62D 13/00* (2006.01)
*B64F 1/00* (2006.01)

(52) U.S. Cl.
USPC ......... 414/482; 414/495; 280/656; 244/17.17

(58) Field of Classification Search
USPC ................ 414/482, 495; 280/656; 244/17.17
See application file for complete search history.

(56) References Cited

U.S. PATENT DOCUMENTS

| | | | | | |
|---|---|---|---|---|---|
| 2,826,431 | A | * | 3/1958 | Able et al. | 280/474 |
| 3,009,711 | A | * | 11/1961 | White | 280/43.23 |
| 3,262,678 | A | * | 7/1966 | Hand | 254/2 B |
| 3,529,736 | A | * | 9/1970 | Lebre | 414/458 |
| 3,539,065 | A | * | 11/1970 | Brownell | 414/458 |
| 3,802,006 | A | * | 4/1974 | Nelson et al. | 114/344 |
| 3,885,691 | A | * | 5/1975 | Knapp | 414/495 |
| 4,087,013 | A | * | 5/1978 | Wiley, Jr. | 414/459 |
| 4,223,856 | A | * | 9/1980 | DiVincenzo | 244/50 |
| 4,488,612 | A | * | 12/1984 | Patterson | 180/14.1 |
| 4,516,744 | A | * | 5/1985 | Burnside | 244/17.17 |
| 4,902,188 | A | * | 2/1990 | Page | 414/495 |
| 5,056,981 | A | * | 10/1991 | Knowles | 414/495 |
| 5,135,346 | A | * | 8/1992 | Roach | 414/495 |
| 5,580,207 | A | * | 12/1996 | Kiebooms et al. | 414/495 |
| 5,655,733 | A | * | 8/1997 | Roach | 244/50 |
| 6,203,263 | B1 | * | 3/2001 | Hancock | 414/458 |
| 6,382,358 | B1 | * | 5/2002 | Kritzer | 187/208 |
| 7,153,080 | B2 | * | 12/2006 | Schmidt | 414/482 |

* cited by examiner

*Primary Examiner* — Scott Lowe
(74) *Attorney, Agent, or Firm* — Jackson IPG PLLC

(57) ABSTRACT

A trailer is provided for a helicopter. The trailer includes a chassis, at least two lifters provided on the chassis, at least two drivers provided on the chassis and connected to the lifters, at least two locks for locking the lifters in an upper position and a connector for connecting the chassis to a vehicle.

5 Claims, 8 Drawing Sheets

TRAILER FOR HELICOPTER

FIELD OF THE INVENTION

The present invention relates to a helicopter and, more particularly, to a trailer for carrying a helicopter with skid landing gear stably and safely without, under certain adverse conditions, ballasting the helicopter and potential risk of damaging the skids of the helicopter.

DESCRIPTION OF THE RELATED ARTS

To transport a helicopter with two skids on the ground, several rolling elements are attached to the skids. Then, a tractor is used to tow the helicopter from one location to the other. Sometimes, to prevent the helicopter from tilting or falling, several peoples stand on side panels of the helicopter as ballast to balance helicopter.

To transport the helicopter in the foregoing manner, a certain rolling elements which attached on the helicopter skids must be used. Moreover, it requires a lot of man power. The process is rather complicated and time consuming. Furthermore, the helicopter might get damaged if the skid is fatigued due to vulnerability of its structure nature.

The present invention is therefore intended to obviate or at least alleviate the problems encountered in prior art.

SUMMARY OF THE INVENTION

It is the primary objective of the present invention to provide an efficient, reliable trailer for a helicopter with skid landing gear.

To achieve the foregoing objective, the trailer includes a chassis, at least two lifters provided on the chassis, at least two drivers provided on the chassis and connected to the lifters, at least two locks for locking the lifters in an upper position and a connector for connecting the chassis to a vehicle.

Other objectives, advantages and features of the present invention will become apparent from the following description referring to the attached drawings.

BRIEF DESCRIPTIONS OF THE DRAWINGS

The present invention will be described via detailed illustration of the preferred embodiment referring to the drawings.

Figure 1:
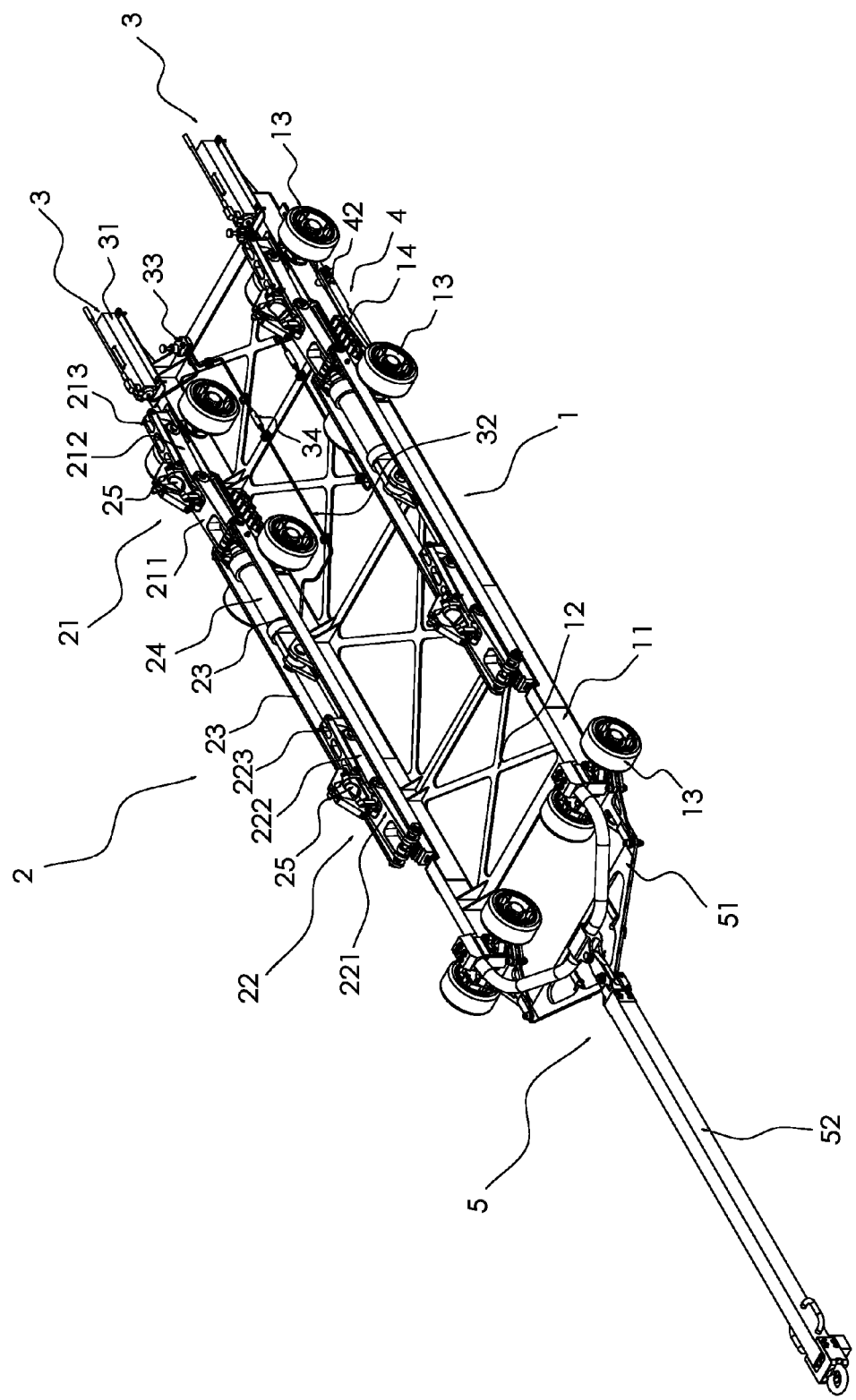
FIG. 1 is a perspective view of a trailer for a helicopter according to the preferred embodiment of the present invention showing both lifters in their retracted positions.
Figure 3:
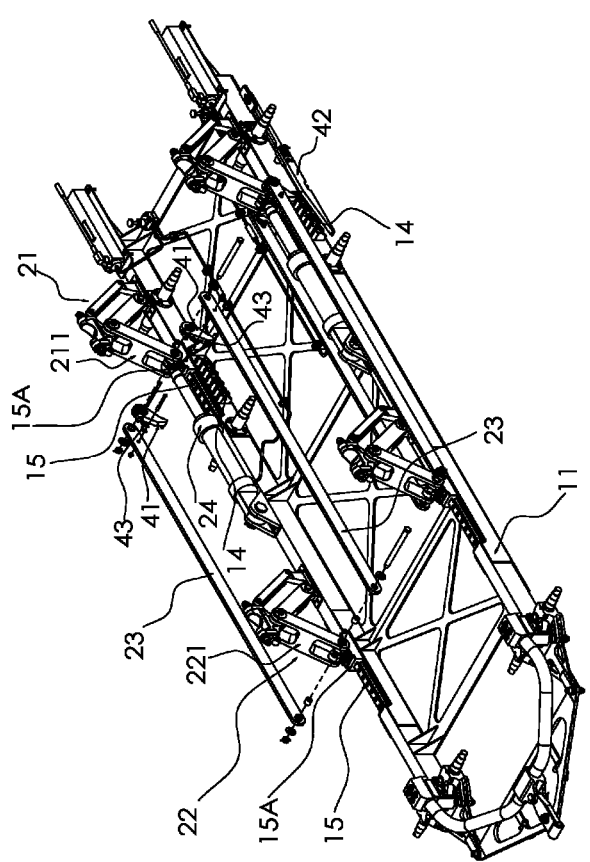

FIG. 3 is another exploded, partial view of the trailer of FIG. 1 showing both lifters 2 in their lifting positions, two rods 23 and two sliding elements 15A hinged with primary link 211 of the first lifting unit 21 at one end and hinged with primary link 221 of the second lifting unit 22 at another end. Two detents are shown hinged with two rods 23, a pusher 24, a sliding element 15A and a primary link 211 together. Two springs 43 attach to respective detents 41 and rods 23.

Figure 4:
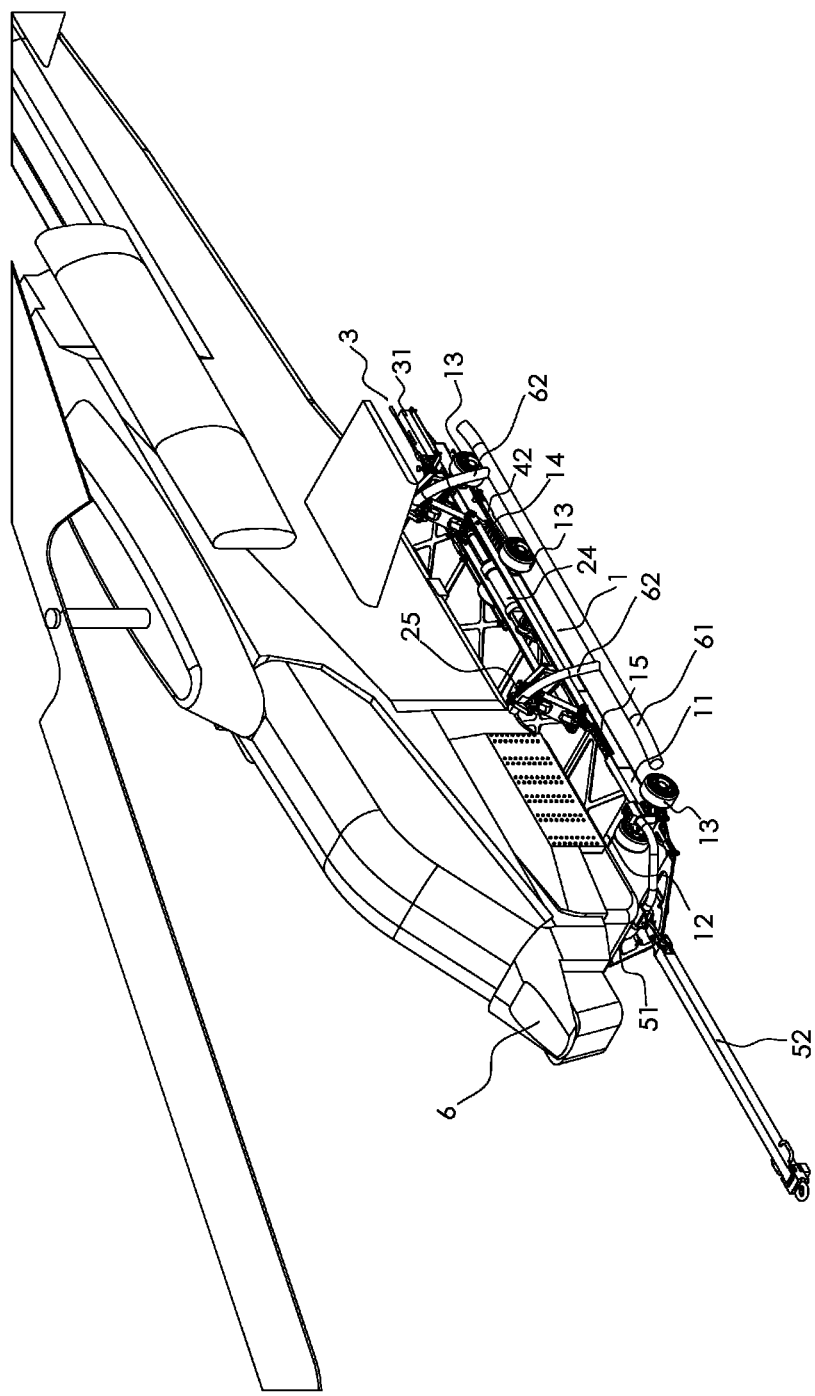

FIG. 4 is a perspective view of a helicopter transported on a trailer shown in FIG. 1.

Figure 5:
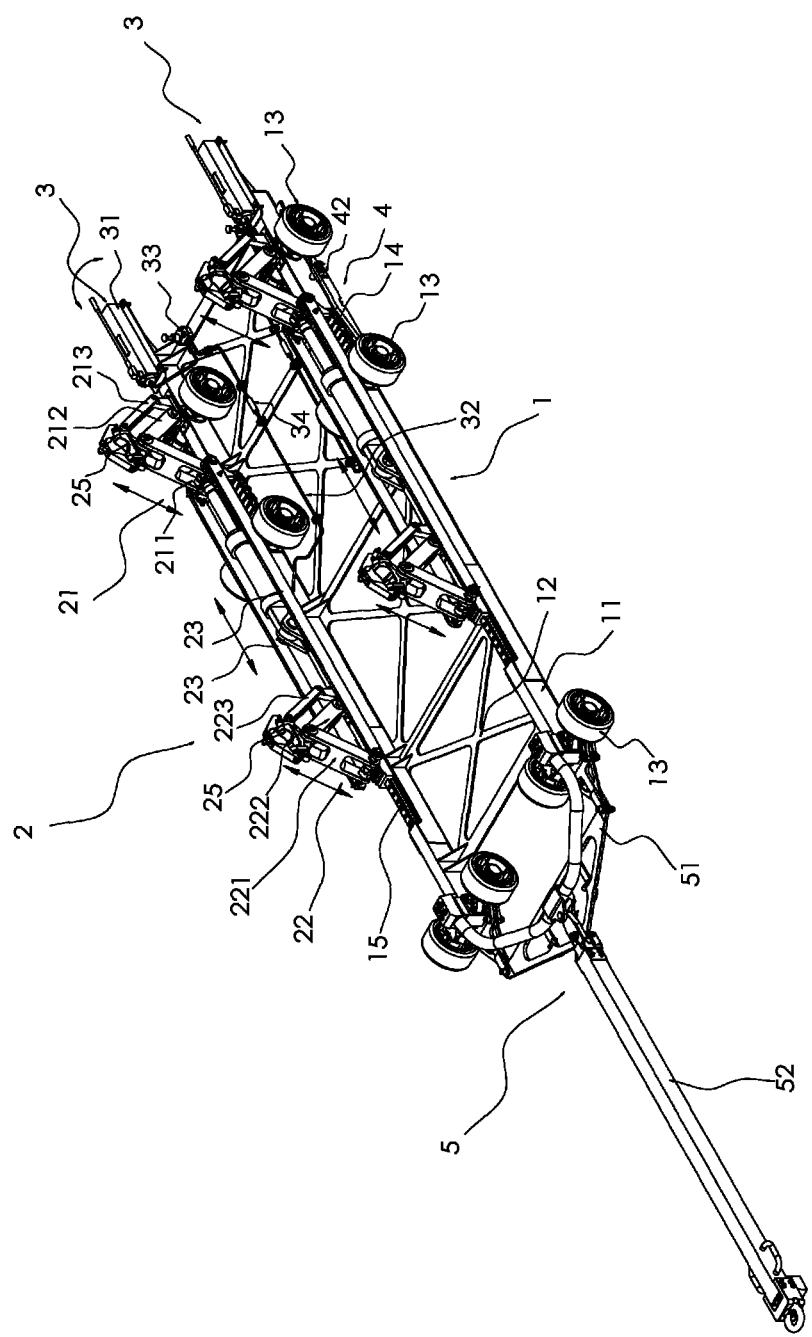

FIG. 5 is a perspective view of the trailer showing the lifter in its lifted position in contrast to the position shown in FIG. 1.

Figure 6:
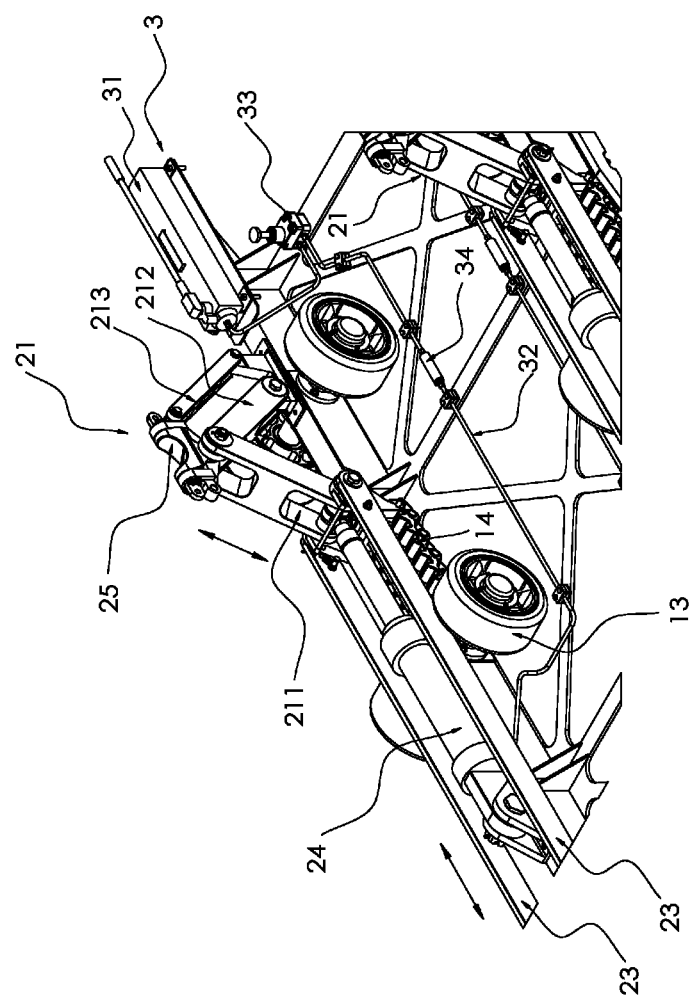

FIG. 6 is a partial view of the trailer showing drivers 3.

Figure 7:
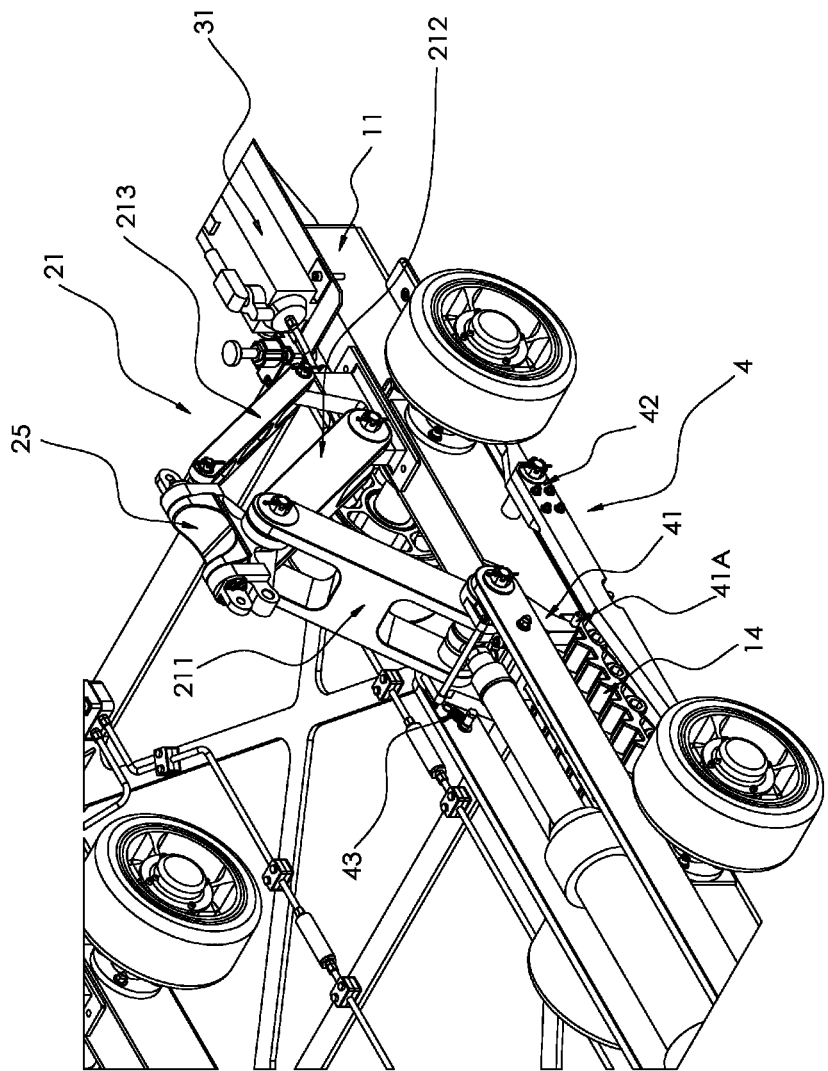

FIG. 7 is another partial view of the trailer showing lock 4 and its parts including the detent 41 engaged in rack 14, the lever 42 shown closely located to the pin 41A fixed on the detent 41.

Figure 8:
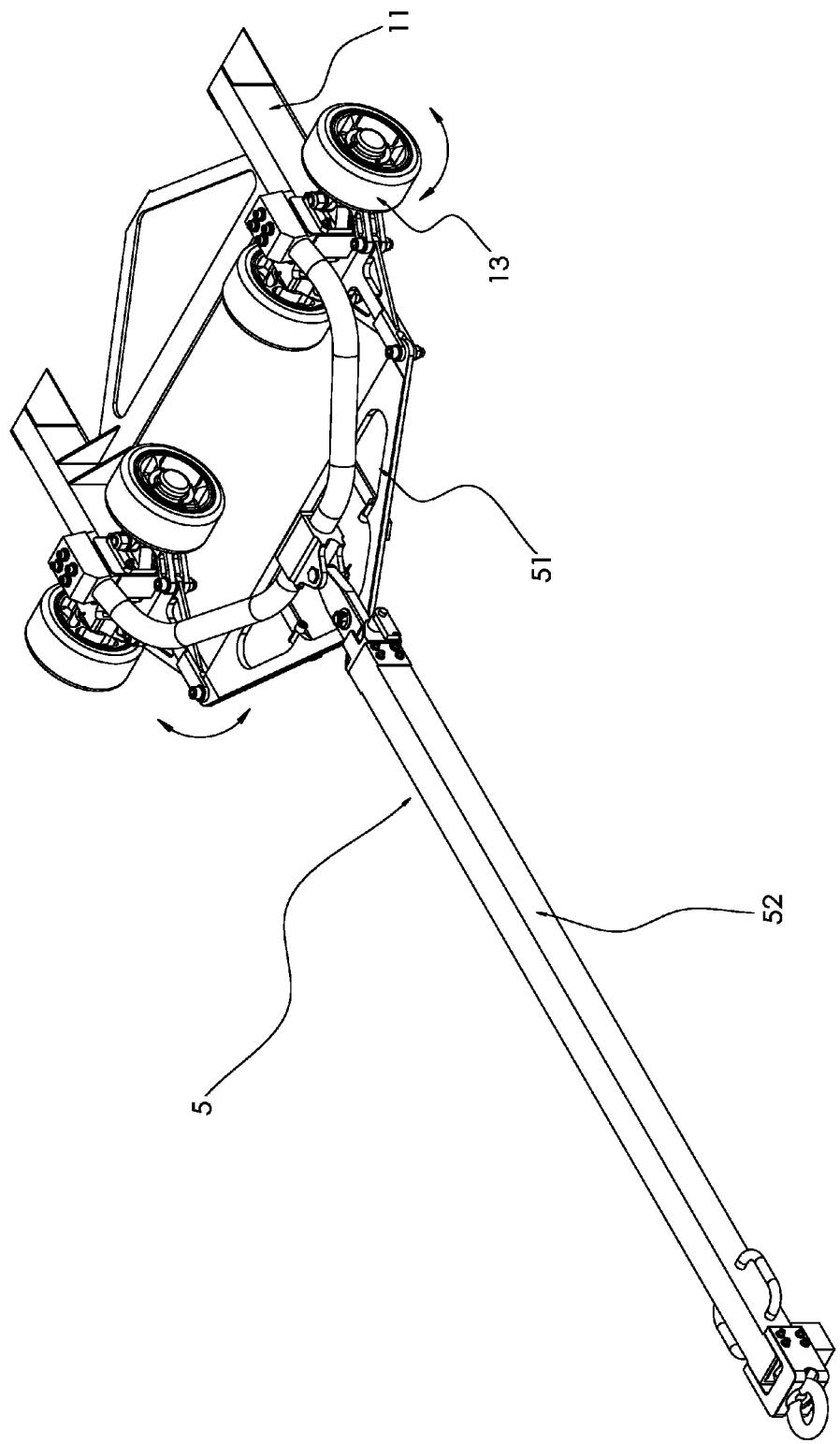

FIG. 8 is another partial view of the trailer showing connector 5 and its parts.

DESCRIPTION OF THE PREFERRED EMBODIMENT

Figure 2:
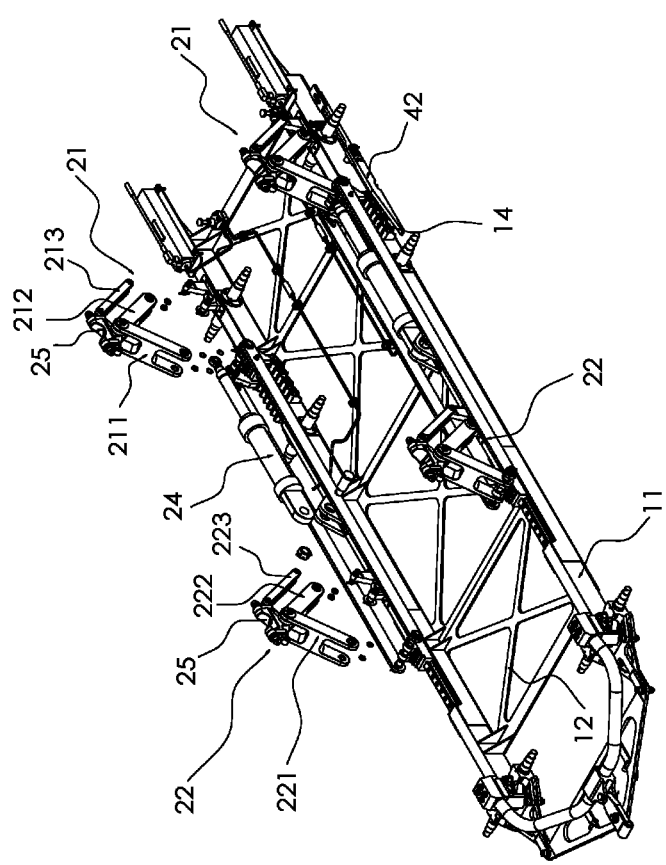
FIG. 2 is an exploded, partial view of the trailer shown in FIG. 1 showing both lifting units 21 and 22 in their lifting positions.

Referring to FIGS. 1 through 3, a trailer includes a chassis 1, two lifters 2, two drivers 3, two locks 4 and a connector 5. The chassis 1 includes a frame 11, boards 12, two groups of wheels 13, two pairs of tracks 15 and two racks 14. The frame 11 includes two beams. Each group of wheels 13 and a related pair of tracks 15 are attached to a related one of the beams. Each pair of tracks 15 includes a front track 15 and a rear track 15. Each rack 14 is attached to a related one of the beams, next to a related rear track 15.

Each lifter 2 includes a rear lifting unit 21, a front lifting unit 22, two rods 2, a pusher 24 and a front contact element 25 and a rear contact element 25. The rear lifting unit 21 includes two primary links 211 and 212 and an auxiliary 213. The primary link 212 includes an end pivotally but not movably connected to a related one of the beams and another end pivotally connected to a first end of the primary link 211. A second end of the primary link 211 is movably connected to the related beam of the frame 11. More particularly, the second end of the primary link 211 is pivotally linked to a sliding or rolling element movable along the front track 15.

The rear contact element 25 includes a middle point pivotally connected to a joint between the primary links 211 and 212 and an end pivotally connected to an end of the auxiliary link 213. Another end of the auxiliary link 213 is connected to the related beam of the frame 11.

The front lifting unit 22 includes two primary links 221 and 222 and an auxiliary link 223. The primary link 222 includes an end pivotally but not movably connected to a related one of the beam of the frame 11 and another end pivotally connected to a first end of the primary link 221. A second end of the primary link 221 is movably connected to the related beam of the frame 11. More particularly, the second end of the primary link 221 is pivotally linked to a sliding or rolling element movable along the rear track 15.

The front contact element 25 includes a middle point pivotally connected to a joint between the primary links 221 and 222 and an end pivotally connected to an end of the auxiliary link 223. Another end of the auxiliary link 223 is connected to the related beam of the frame 11.

Each rod 23 includes an end pivotally connected to the second end of the primary link 211 and another end pivotally connected to the second end of the primary link 221. Thus, the primary links 211 and 221 are movable together with each other.

The pusher 24 includes a first end pivotally connected to the second end of the primary link 211 and a first end pivotally connected to the related beam of the frame 11. The pusher 24 is an extensible device such as a hydraulic or pneumatic cylinder.

Each driver 3 includes a hydraulic or pneumatic pump 31 connected to a related pusher 24 through a pipe 32. A control-control valve 33 and a flow-regulator valve 34 are provided on the pipe 32. The hydraulic or pneumatic pump 31 can be actuated to provide liquid or air into the related pusher 24, thus extending the related pusher 24.

The front lifting unit 21 and the rear lifting unit 22 are normally in an in-line position so that the front and rear contact elements 25 are in a lower position. The hydraulic or pneumatic pump 31 can be actuated to extend the pusher 24 to push the primary link 211 towards the primary link 212 directly and move the primary link 221 to towards the primary link 222 through the rods 23. Hence, the front lifting unit 21 and the rear lifting unit 22 are moved to a bent position where the front and rear contact elements 25 are in an upper position.

Each lock 4 includes a detent 41, a lever 42 and a spring 43. The detent 41 includes a first end pivotally connected to the second end of a related primary link 211 or 221 and a second end for engagement with a related rack 14. The front lifting unit 21 or rear lifting unit 22 is locked in the bent position when the second end of the detent 41 is engaged with a related rack 14. The lever 42 is linked to the detent 41. The lever 42 is operable to disengage the detent 41 from the related rack 14. The spring 43 includes an end attached to the detent 41 and another end connected a related rod 23.

The connector 5 includes a steering device 51 and a rod 52. The steering device 51 is connected to the frame 11. Some wheels 13 are attached to the steering device 51. The rod 52 includes an end connected to the steering device 51 and another end for connection to a trailer for example.

Referring to FIGS. 4 through 8, a helicopter 6 includes two skids 61 and two cross-tubes 62 for connecting the skids 61 to each other and to a lower portion of the helicopter 6. Because of a low profile, the trailer can be moved below a helicopter 6. The contact elements 25 are located below the cross-tubes 62. The hydraulic or pneumatic cylinders 31 are actuated to extend the pushers 24 to push the primary links 211 towards the primary links 212 directly and move the primary links 221 to towards the primary links 222 through the rods 23. Accordingly, the front lifting units 21 and the rear lifting units 22 are moved to the bent position where the front and rear contact elements 25 are in the upper position. Hence, the helicopter 6 is lifted. The lifting units 21 and 22 are locked in the bent position since the detents 41 are engaged with the racks 14 because of the springs 43.

To lower the helicopter 6, the levers 42 are operated to disengage the detents 41 from the racks 14, and the hydraulic or pneumatic cylinders 31 are disabled. The pushers 24 and the cylinders 31 together ensure gentle lowering of the helicopter.

The trailer exhibits several advantages. Firstly, the helicopter 6 can be transported with the trailer firmly because of the contact elements 25. Secondly, the demand for labor is low for not having to send people standing in the helicopter 6 to adjust the mass center of the helicopter 6. Thirdly, the movement of the trailer below the helicopter 6 is easy because of the low profile. Fourthly, only two pushers 24 are needed for using the rods 23 to interconnect the lifting units 21 and 22. Fifthly, the chance of damaging the helicopter 6 during the lowering operation is small due to the use of the pushers 24 and the cylinders 31 for buffering.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A trailer comprising:
   a chassis;
   at least two lifters provided on the chassis;
   at least two drivers provided on the chassis and connected to the lifters;
   at least two locks comprising at least one detent with a first end and a second end, said first end jointly hinged with an end of the lifter and a sliding element, said second end engaged with a rack with a plurality of teeth, for locking the lifters in any intermittent upper position corresponding to the engaged tooth on the rack by the restoring force of a spring, and disengaged by a lever manually;
   wherein each of the lifters comprises:
      a first lifting unit provided on a frame of the chassis;
      a second lifting unit provided on the frame;
      at least one rod for connecting the first lifting unit to the second lifting unit;
      a pusher for pushing the first lifting unit directly and pushing the second lifting unit through the rod; and
      a contact element provided on each of the lifting units;
      the first lifting unit comprising:
         a first primary link with an end pivotally connected to the chassis;
         a second primary link comprising an end hinged on the sliding element of one of the locks movably provided on the chassis and another end pivotally connected to another end of the first primary link;
         an auxiliary link comprising an end pivotally connected to the chassis and another end pivotally connected to the contact element;
         the contact element includes a middle point pivotally connected to a joint between the primary links;
      the second lifting unit comprising:
         a first primary link with an end pivotally connected to the chassis;
         a second primary link comprising an end hinged on the sliding element of one of the locks movably provided on the chassis and another end pivotally connected to another end of the first primary link;
         an auxiliary link comprising an end pivotally connected to the chassis and another end pivotally connected to the contact element;
         the contact element includes a middle point pivotally connected to a joint between the primary links.

2. The trailer according to claim 1,
wherein the chassis comprises:
   the frame;
   boards provided on the frame;
   wheels attached to the frame;
   two front tracks provided on the frame and used for guiding the movement of the lifters;
   two rear tracks provided on the frame and used for guiding the movement of the lifters; and
   two racks each located next to a related one of the rear tracks and used for engagement with a related one of the locks.

3. The trailer according to claim 1,
wherein each of the drivers comprises:
   a pump;
   a pipe for connecting the pump to the related lifter;
   a flow-control valve provided on the pipe; and
   a flow-regulator valve provided on the pipe.

4. The trailer according to claim 1,
a connector for connecting the chassis to a vehicle wherein each of the locks comprises:
   at least one detent hinged jointly with the sliding element, an end of the primary link and an end of the rod comprising the moving parts of the lock, such that the at least one detent can move along the rear track engaging with stationary parts comprising the rack mounted on the frame;

the lever hinged on the frame with a length overlapped with the travel of the at least one detent and closely located to it so that the lever is operable from the other end and a push pin fixed on the at least one detent configured to disengage the at least one detent from the chassis; and the spring linking one end of the at least one detent and the rod providing a restoring force such that the at least one detent can engage with the stationary parts comprising the rack mounted on the frame while the detent moves along the rear track.

5. The trailer according to claim 1, wherein the connector comprises a steering device connected to the chassis and the rod pivotally connected to the steering device.

\* \* \* \* \*